United States Patent [19]
Wenbourne

[11] 3,908,517
[45] Sept. 30, 1975

[54] HYDROSTATIC ENGINE CONTROL
[75] Inventor: Alan E. G. Wenbourne, Strood, England
[73] Assignee: Twin Disc, Incorporated, Racine, Wis.
[22] Filed: May 11, 1973
[21] Appl. No.: 359,612

[30] Foreign Application Priority Data
May 26, 1972 United Kingdom............ 24903/72

[52] U.S. Cl. .................................................. 91/497
[51] Int. Cl.² ................................................ F01B 13/06
[58] Field of Search...... 74/571 L; 417/273; 91/497, 91/476, 492

[56] References Cited
UNITED STATES PATENTS
| 1,453,417 | 5/1923 | Stone | 74/571 L |
| 2,013,468 | 9/1935 | Klocke | 74/571 L |
| 2,345,125 | 3/1944 | Huber | 417/273 |
| 2,356,993 | 8/1944 | Glasner | 74/571 L |
| 2,404,175 | 7/1946 | Holden et al. | 417/221 |
| 3,255,707 | 6/1966 | Platt | 91/497 |
| 3,828,400 | 8/1974 | Mason | 91/497 |

FOREIGN PATENTS OR APPLICATIONS
| 945,332 | 11/1948 | France | 103/174 |
| 1,238,361 | 7/1971 | United Kingdom | 91/492 |

Primary Examiner—William L. Freeh
Attorney, Agent, or Firm—James E. Nilles

[57] ABSTRACT

A multipiston hydrostatic engine of the radial cylinder type is equipped with a variable throw crankshaft. The radial piston thrusts of the engine act upon a cam ring which is rotatably centered on a radially in and out shiftable slideblock on the crankpin of the crankshaft. An oblong aperture of the slideblock extends radially of the crankpin and provides a space to which pressure fluid is admitted selectively at one side or the other of the crankpin so as to shift the slideblock in or out and thereby increase or decrease the radial spacing of the cam ring center from the journal axis of the crankshaft.

1 Claim, 8 Drawing Figures

HYDROSTATIC ENGINE CONTROL

BACKGROUND OF THE INVENTION

The invention relates to multipiston hydrostatic engines of the radial cylinder type, and it is concerned more particularly with the problem of controlling the energy output and running speed of such engines.

During the past, two principal methods of controlling the power output and speed of hydrostatic motors have been used. One of these methods is to vary the flow rate of the driving fluid, and the other is to vary the piston displacement of the motor by varying the throw of its crankshaft. Varying the flow rate of the driving fluid has certain inherent drawbacks with respect to operating efficiency, particularly under high speed, low torque power requirements. On the other hand, slow speed, high torque hydrostatic motors equipped with variable throw crankshafts, as heretofore constructed, have not been entirely satisfactory, particularly with respect to simplicity, compactness and sturdiness of construction, wear resistance under severe operating conditions, and manufacture at relatively low costs.

SUMMARY OF THE INVENTION

The invention provides an improved multipiston hydrostatic engine whose piston displacement and running speed are controlled by means of a variable throw crankshaft.

More specifically, the invention provides an improved multipiston hydrostatic motor of the radial cylinder type incorporating hydraulically operable adjusting means for varying the throw of its crankshaft.

The invention further provides a multipiston hydrostatic motor of the above mentioned character and an operating fluid supply system for the motor as well as for its hydraulically operable crankshaft adjusting means, which automatically maintains any selected throw adjustment of the crankshaft upon flow reversal of the driving fluid to the engine.

The invention further provides an improved two-speed hydrostatic motor of the multipiston, radial cylinder type, which may readily be adjusted to operation at either high or low speed by back and forth adjustment of a manually or electrically operable hydraulic control valve.

The invention further provides an improved variable throw crankshaft of simple, compact and sturdy construction, which will operate efficiently and stand up under severe load conditions without undue wear, and which may be manufactured at relatively low costs.

The foregoing and other features of the invention will become more fully apparent as this disclosure proceeds with reference to the accompanying drawings.

DRAWINGS.

DETAILED DESCRIPTION.

Figures 1, 2, 3:
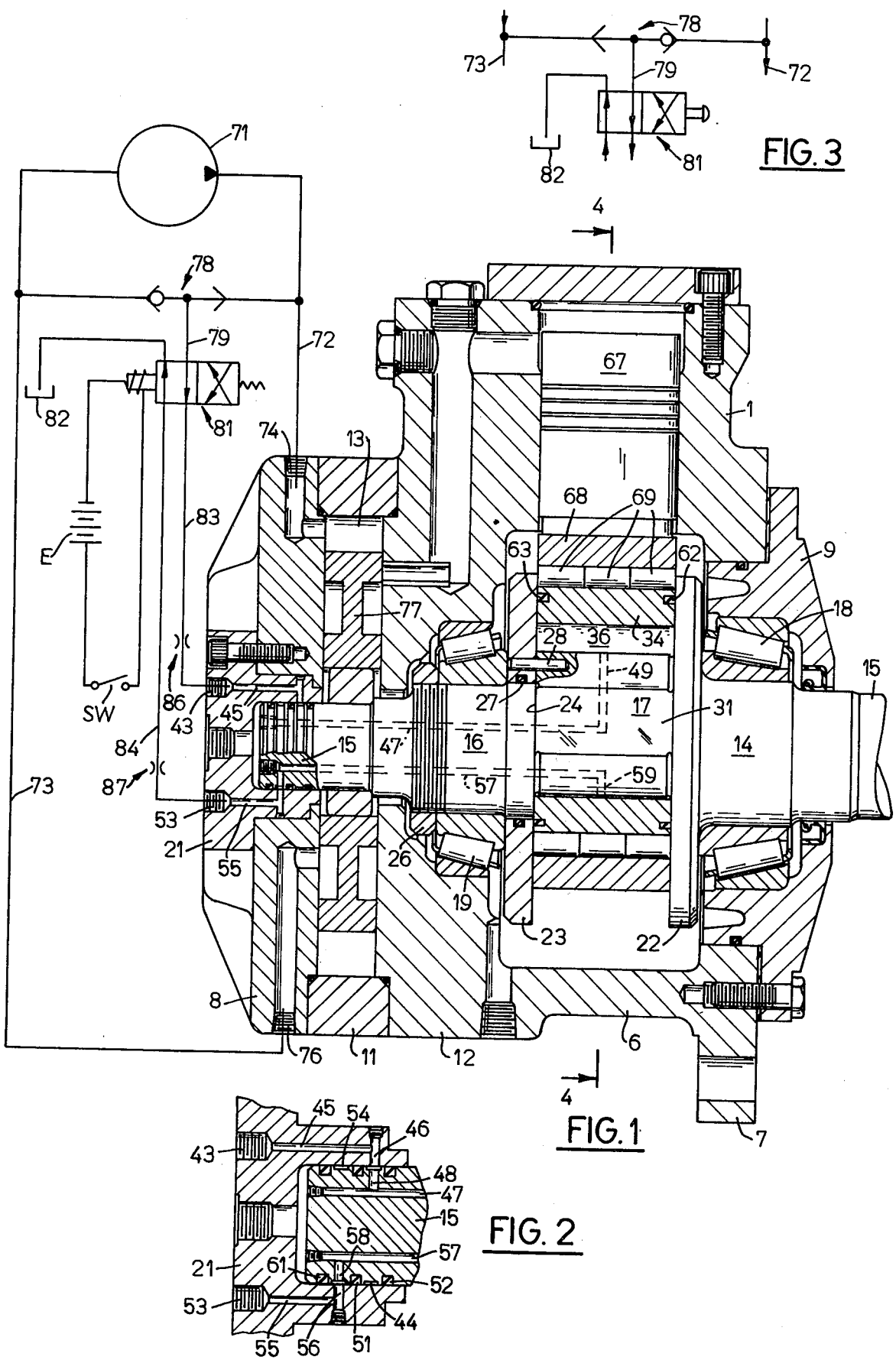
FIG. 1 is a sectional view of a two speed hydrostatic motor incorporating the invention, together with a schematic view of an associated fluid supply circuit.
FIG. 2 is a detail view showing parts of FIG. 1 on an enlarged scale.
FIG. 3 is a partial view of the fluid supply circuit shown in FIG. 1, illustrating a different operating condition and a modified fluid control valve.
Figure 4:
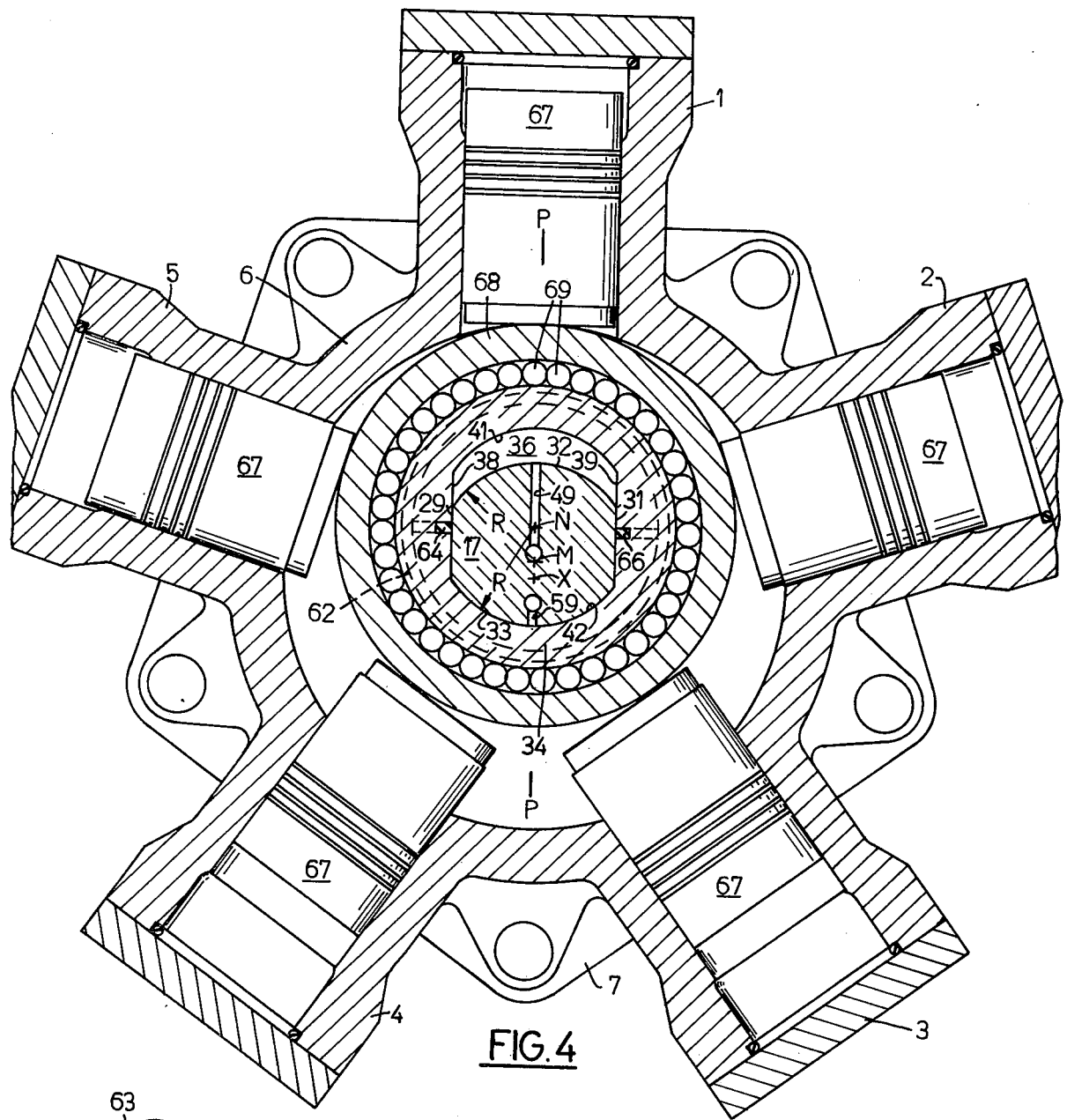
FIG 4 is a sectional view on line 4-4 of FIG. 1.
Figure 5:
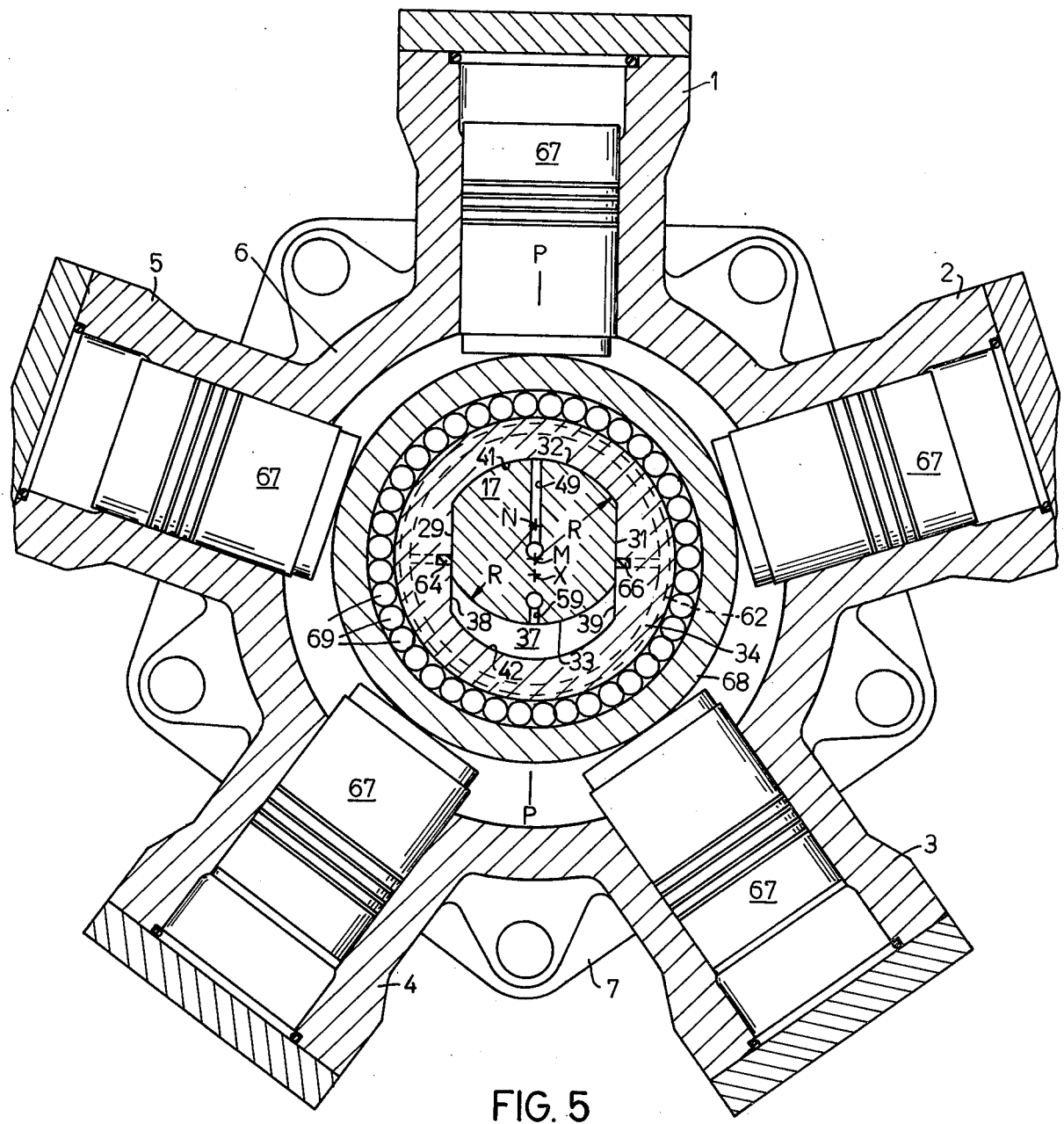
FIG. 5 is a view similar to FIG. 4 but illustrating a different operating condition of the motor.
Figure 6:
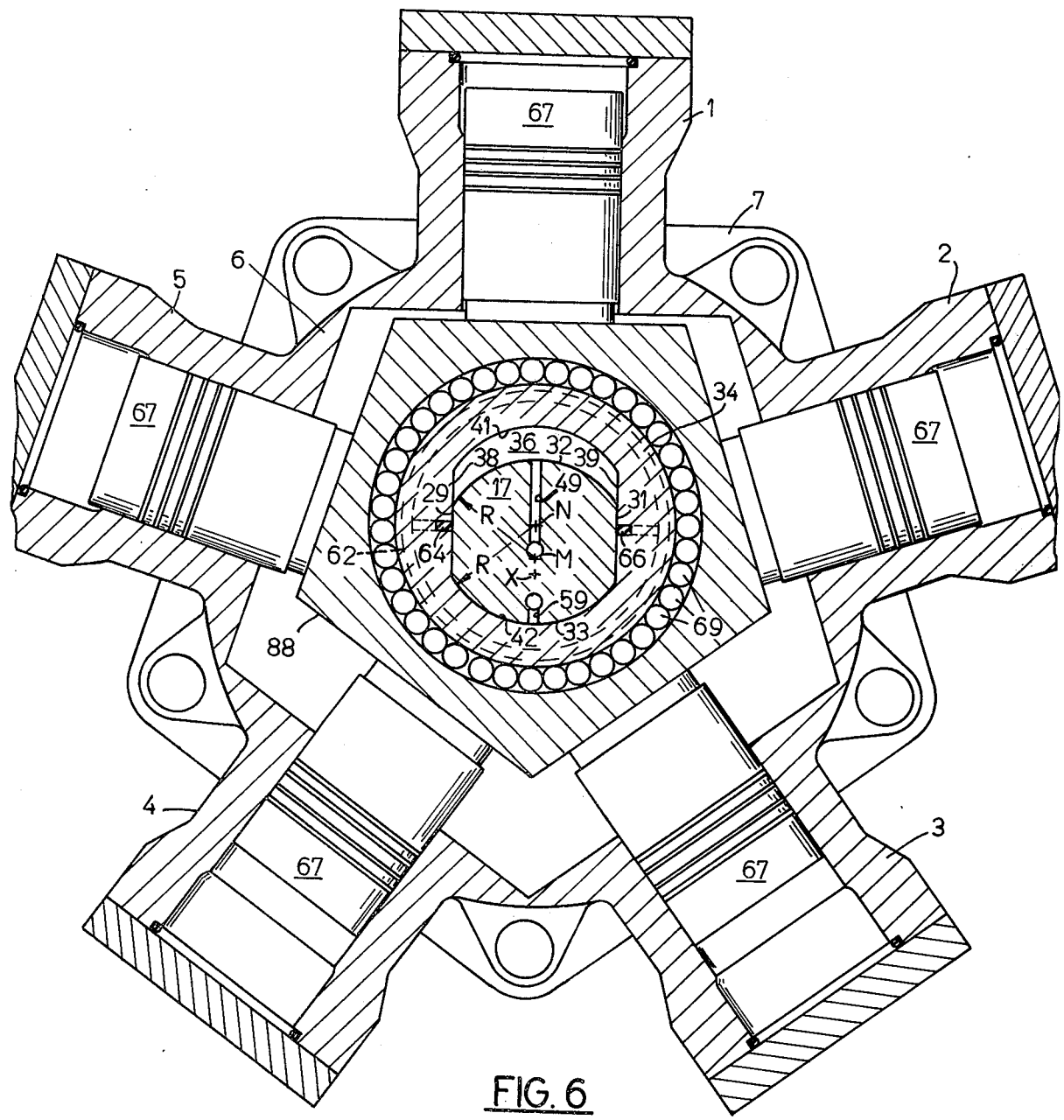
FIG. 6 is another view similar to FIG. 1 but illustrating a modified detail of construction.

In FIGS. 4, 5 and 6 five radial cylinders 1, 2, 3, 4 and 5 of a hydrostatic motor are combined with a crankcase 6, and a radial mounting flange 7 is integrally formed with the crankcase 6 at one side as shown in FIG. 1. End covers 8 and 9 (FIG. 1) are rigidly secured to opposite sides of the crankcase and an annular spacer 11 is interposed between the end cover 8 and an adjacent endwall 12 of the crankcase to provide a valve chamber 13.

A variable throw crankshaft (FIG. 1) designated generally by the reference numeral 15 has axially aligned journals 14 and 16, and a crankpin 17 between the journals within the crankcase 6. Roller bearings 18 and 19 in the end cover 9 and in the end wall 12 of the crankcase support the journals 14 and 16 for rotation of the crankshaft on a horizontal axis, marked X in FIGS. 4 – 6. The journal 14 has an axial extension projecting from the end cover 9 for mounting a belt pulley or the like, not shown; and the journal 16 has an axial extension projecting through the valve chamber 13 and into a fluid distributor ring or hydraulic slip ring 21 in the end cover 8. The purpose and function of the distributor ring 21 will be explained later.

The journals 14 and 16 together with their extensions, and the crankpin 17 are parts of a one-piece forging which also includes a generally circular side plate or flange 22 which extends radially outward from the journal 14 at its juncture with the crankpin 17. Another side plate or flange 23 of the same circular outline as the side plate 22 is fitted upon a shoulder 24 of the journal 16 and axially abuts an adjacent end surface portion of the crankpin 17. A thrust ring 26 on a threaded portion of the journal 16 bears axially against the inner race of the roller bearing 19, and the thrust ring is drawn up so as to force the side plate 23 axially against the crankpin 17 through the inner race of the bearing 19. An O-ring 27 seals the side plate 23 against the shoulder 24 of the journal 16, and a dowel pin 28 extends into the crankpin 17 to secure the side plate 23 against rotation on the one-piece crankshaft forging.

The crankpin 17 is laterally flattened, as best shown in the sectional views of FIGS. 4 – 6. A pair of plane side surfaces 29 and 31 of the crankpin 17 extend at opposite sides of and in parallel relation to a radial plane P — P (FIG. 4) through the journal axis X of the crankshaft 15. At its radially outer side the crankpin 17 has an arcuately convex surface 32 (FIG. 4) which extends axially between the flanges 22, 23 and transversely; between the plane surfaces 29 and 31, and at its radially inner side the crankpin 17 has a similar arcuately convex surface 33 (FIG. 5) between the plane surfaces 29 and 31. The radius of curvature R of the surface 32 (FIG. 4) extends from a point M on the line P—P at a relatively short radial distance from the journal axis X, and the radius of curvature R for the surface 33 (FIG. 5) extends from a point N on the line P—P at a relatively great distance from the journal axis X, the length of the radius R being the same in both cases.

An annular slideblock 34 is fitted upon the crankpin 17 in radially back and forth shiftable relation thereto and cooperates therewith to define a pair of opposite, radially expandable and contractable fluid chambers 36 (FIG. 4) and 37 (FIG. 5) within the slideblock. A central diametrically elongated aperture of the slideblock 34 presents a pair of parallel diametrically opposite plane internal surfaces 38 and 39 in contacting relation, respectively, with the plane surfaces 29 and 31 of the crankpin 17 and axially opposite radial end faces in contacting relation with adjacent radial surfaces of the flanges 22 and 23. The diametrically elongated aperture of the slideblock 34 further has an arcuately concave end face 41 (FIG. 4) opposite to and matching the arcuate surface 32 of the crankpin 17. Another arcuately concave end face 42 (FIG. 5) of the slideblock 34 is disposed opposite to and matches the arcuate surface 33 of the crankpin 17.

FIG. 4 shows the slideblock 34 in a radially outward shifted limit position which is determined by contact of the arcuate slideblock surface 42 (FIG. 5) with the arcuate crankpin surface 33, and which establishes a fully expanded condition of the fluid chamber 36. A radially inward shifted limit position of the slideblock 34 as shown in FIG. 5 is determined by contact of the arcuate slideblock surface 41 (FIG. 4) with the arcuate crankpin surface 32 and determines a fully expanded condition of the fluid chamber 37.

Shifting of the slideblock 34 to its radially outward and radially inward limit positions is accomplished bydraulically, and for that purpose fluid passages are provided leading into the chambers 36 and 37, respectively. The fluid passage leading into the chamber 36 comprises an inlet opening 43 in the hydraulic slip ring 21; and annular groove 44 (FIG. 2) in the adjacent end of the crankshaft 15; axial and radial bores 45, 46 connecting the inlet opening 43 with the annular groove 44; a long axial bore 47 (FIG. 1 in the crankshaft; a short radial bore 48 (FIG. 2) connecting the bore 47 with the groove 44; and a radial bore 49 (FIG. 1) extending from the axial bore 47 through the crankpin 17 and terminating at the arcuate surface 32 (FIG. 4) of the latter. Fluid leakage from the groove 44 is minimized by seal rings 51 and 52 (FIG 2) at the axially opposite sides of the groove 44.

The fluid passage leading into the chamber 37 (FIG. 5) comprises an inlet opening 53 in the hydraulic slip ring 21; an annular groove 54 (FIG. 2) in the adjacent end of the crankshaft 15; axial and radial bores 55, 56 connecting the inlet opening 53 with the annular groove 54; a long axial bore 57 (FIG. 1) in the crankshaft 15; a short radial bore 58 FIG. 2) connecting the bore 57 with the groove 54; and a radial bore 59 (FIG 1) extending from the bore 57 through the crankpin 17 and terminating at the arcuate surface 33 (FIG. 5) of the latter. Fluid leakage from the groove 54 is minimized by the seal ring 51 and a seal ring 61 at the axially opposite sides of the groove 54.

The axial length of the slideblock 34 (FIG. 1) is such as to establish a running fit of its end faces with the adjacent radial faces of the side plates 22 and 23. Fluid leakage from the chambers 36, 37 past the axially opposite ends of the slideblock 34 is minimized by seal rings 62, 63 (FIG. 1) seated in circular grooves at the axially opposite ends of the slideblock 34 and sealingly bearing against the adjacent end faces of the side plates 22 and 23, respectively. Fluid leakage from the expansion chamber 36 into the expansion chamber 37, and vice versa, past the plane surfaces 29, 31 of the crankpin 17 is minimized by straight seal bars 64 and 66 (FIG. 4) seated in axial grooves of the slideblock 34 and sealingly bearing against the internal plane surfaces 38 and 39, respectively, of the slideblock 34.

Figure 7:
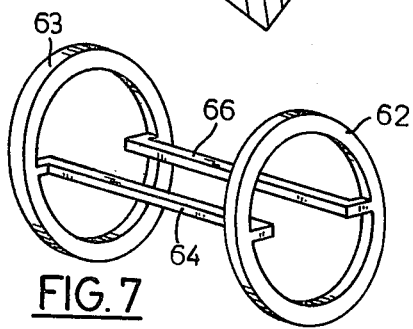
FIG. 7 is a perspective view of a composite seal structure incorporated in the motor shown in FIGS. 1, 4, 5 and 6.
Figure 8:
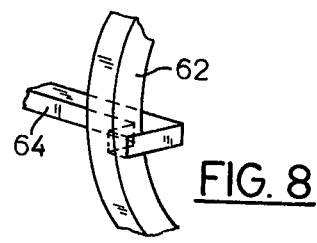
FIG. 8 is a detail view illustrating a modification of the seal structure shown in FIG. 7.

The seal rings 62, 63 and the seal bars 64, 66 may be combined as shown in FIG. 7, into a composite structure. The preferred material for the rings 62, 63 and for the bars 64, 66 is metal and/or flass filled polytetrafluoroethylene, and the rings as well as the bars are backed by a synthetic rubber elastomeric member. Polytetrafluoroethylene, however, does not lend itself to molding and in order to form the composite seal structure shown in FIG. 7 half butt joints, as shown in FIG. 8, with or without adhesive, are provided for connecting the opposite ends of the bars 64, 66 with the rings 62, 63.

The motor cylinders 1 – 5 are each conventionally provided with a reciprocation piston 67, and thrust transmitting means are operatively interposed between the pistons 67 and the slideblock 34. In the embodiment of the invention illustrated by FIGS. 1 – 5 the thrust transmitting means between the motor pistons 67 and the slideblock 34 comprise a cam ring 68 and a triple row roller bearing 69. The slideblock 34 has a cylindrical outer periphery which forms the inner race of the triple row roller bearing 69, and the cam ring 68 has a cylindrical inner periphery which forms the outer race of the triple row roller bearing. The outer periphery of the cam ring is cylindrical and concentric with the inner periphery of the cam ring, and the roller bearing 69 rotatably centers the cam ring on the slideblock 34.

In the inwardly shifted limit position of the slideblock 34 as shown in FIG. 5, the center of the cam ring 68 coincides with the point M on the line P — P at a relatively short distance from the journal axis X. This inwardly adjusted position of the cam ring center relative to the journal axis X places the crankshaft 15 into its minimum throw condition.

In the outwardly shifted limit position of the slideblock 34 as shown in FIG. 4, the center of the cam ring 68 coincides with the point N on the line P — P at a relatively long distance from the journal axis X. This outwardly adjusted position of the cam ring center places the crankshaft 15 into its maximum throw conditions.

The supply of operating fluid to the motor cylinders 1 – 5 as well as to the fluid chambers 36 and 37 of the crankshaft is illustrated by the circuit diagram of FIG. 1. A pump 71 has fluid ports connected by fluid lines 72 and 73 with fluid ports 74 and 76 of the motor. The pump 71 is reversible and as shown in FIG. 1 it delivers pressure fluid through the line 72 to the port 74 of the motor. From the port 74 the fluid passes into the valve chamber 13 from which it is directed successively to the cylinders 1 – 5 by a shuffle valve plate 77 in conventional manner. Actuating fluid returning from the cylinders into the valve chamber 13 is directed by the valve plate 77 to the motor port 76 from which it returns to the pump 71 through the fluid line 73.

A shuttle valve 78 of conventional construction is connected across the motor ports 74, 76 and has a center tap 79 receiving pressure from the fluid line 72 when it is pressurized by the pump 71 as shown in FIG. 1. When the pump 71 is reversed the line 73 becomes pressurized and the tap 79 of the shuttle valve 78 is again supplied with pressure fluid as shown in FIG. 3.

A two-position, fourway hydraulic control valve 81 is connected at its inlet side with the tap 79 and with a sump 82, and at its outlet side the valve 81 is connected with the openings 43, 53 of the hydraulic slip ring 21 by fluid lines 83, 84, respectively. In the condition of the hydraulic circuit as shown in FIG. 1, the fluid chamber 36 of the crankshaft 15 is pressurized; and the fluid chamber 37 is vented and in fully contracted condition. The throw of the crankshaft 15 under these conditions as at its maximum and the motor will therefore operate at a relatively low speed and high torque.

Adjustment of the valve 81 from its direct flow position in which it is shown in FIG. 1 to its reverse flow position (not shown) pressurizes the fluid line 84 and the fluid chamber 37 of the crankshaft 15. At the same time the fluid chamber 36 is vented and in its fully contracted condition. In this case, the throw of the crankshaft 15 is at its minimum, and the motor will therefore operate at a relatively high speed and low torque.

It will be seen from the foregoing explanations that the fluid pressure to actuate the slideblock 34 of the crankshaft is equal to the motor operating fluid pressure at all times. To achieve correct operation, the areas of the crankpin surfaces 32 (FIG. 4) and 33 (FIG. 5) are calculated to exceed the resultant component of piston area along the line of action of the throw.

The two-position, fourway valve 81 is shown in FIG. 1 as a conventional spring biased, solenoid operated valve. An electrical circuit for energizing the solenoid coil of the valve includes a D.C. current source, such as a battery E, and an on-off switch Sw. With the switch open, the motor is in its low speed, high torque operating condition; and with the switch Sw closed the motor is in its high speed low torque operating condition. In lieu of the spring biased, solenoid operated valve, a simple, manually operated two-position valve may be used as shown in FIG. 3. If desired, the shuttle valve 78 and the valve 81 may be incorporated in the end cover 8 of the motor.

Flow restrictors 86, 87 (FIG. 1) may be provided for the lines 83 and 84 to regulate the rate of change from one crankshaft throw to the other. The restrictors 86, 87 may be pressure and/or viscosity compensated, as required. In practice, the change-over can be made to be from a fraction of a second to several seconds, as required.

FIG. 6 illustrates a modified embodiment of the invention, incorporating a pentagonal cam ring 88 in lieu of the cylindrical cam ring 68 of FIGS. 1 - 5. The pentagonal cam ring 88 affords broader contact areas for the pistons 67 of the cylinders 1 - 5, and is therefore more wear resistant than the cylindral cam ring 68.

I claim:

1. In a multipiston hydrostatic engine of the radial cylinder type the combination of a crank case, a crank shaft rotatably mounted in said crank case and having a pair of axially spaced radial flanges therein and a crankpin extending axially between said flanges, said crank pin having a pair of plane side surfaces at opposite sides of and in parallel relation to a radial plan through the journal axis of said crankshaft, and diametrically opposite arcuately convex surfaces extending axially between said flanges and transversely between said plane side surfaces; an annular slide block surrounding said crank pin in radially back and forth shiftable relation thereto, said slide block having a pair of parallel diametrically opposite plane internal surfaces in contacting relation with said plane parallel side surfaces of said crank pin, axially opposite radial end faces in contacting relation, respectively, with adjacent radial surfaces of said flanges and radially opposite arcuately concave internal surfaces extending axially between said end faces and circumferentially between said parallel internal surfaces whereby a pair of radially expandable and contractable fluid chambers are provided at diametrically opposite sides of said crank pin between the latter and said slide block; annular sealing means operatively interposed between each of said axially opposite radial end faces of said slide block and the adjacent radial surfaces of said flanges; and linear sealing means extending axially of said crank pin and operatively interposed between each of said side surfaces of the latter and the adjacent plane internal surface of said slide block, said crankshaft being provided with internal fluid passages communicating, respectively, with said fluid chambers; and thrust transmitting means operatively interposed between radially reciprocable engine pistons and said slide block.

* * * * *